March 21, 1967 W. FISCHER 3,310,791

ADJUSTABLE THREE POINT BEARING HOLDING DEVICE FOR MAGNETIC HEADS

Filed March 5, 1963

INVENTOR.
WALTER FISCHER
BY Percy P. Lantzy
ATTORNEY 3,310,791

ADJUSTABLE THREE POINT BEARING HOLDING DEVICE FOR MAGNETIC HEADS

Walter Fischer, Stuttgart-Stammheim, Germany, assignor to International Standard Electric Corporation, New York, N.Y., a corporation of Delaware
Filed Mar. 5, 1963, Ser. No. 263,078
Claims priority, application Germany, Mar. 22, 1962
St 18,990
2 Claims. (Cl. 340—174.1)

Figure 1:
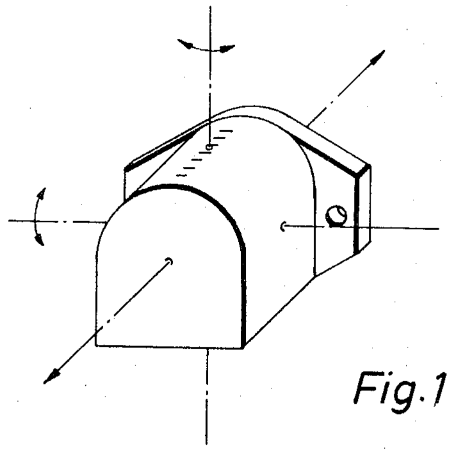

The present invention relates to an arrangement for adjusting the operating airgap of a magnetic head which is mounted in or onto a holding device. In the case of tape recorders the operating airgap of the magnetic head must be capable of being adjusted in such a way with respect to the tape that, by way of twisting and shifting in several stacked vertical planes, there is obtainable an exactly defined position of the operating airgap.

The problem is fundamentally the same in the most various types of tape devices, such as tape-type sound recorders and tape recorders serving the storage or digital data, but the demands which are placed on the mechanical stability of such an adjusting arrangement, and on the accuracy of the adjustment, however, are different. In the case of tape speeds of about 4–20 cm. sec.$^{-1}$, which are customary in dictating machines and tape recorders, the mechanical stressing of the holding device for the magnetic head is far lower than with the tape devices serving the storage of digital data, operating at tape speeds of several m. sec.$^{-1}$, which is above all due to the smaller accelerations, and the lower tape pull.

For the purpose of realizing such adjustable holding devices for magnetic heads there is already used a great number of embodiments which can mostly be traced back to the principle of the three-point bearing, which is above all known from the fields of optical and geodetical devices and which, in its most simple form, consists of the base plate on which the device to be adjusted, is mounted, and of three screws which, at their one end, have a conical design, and are provided with a knurled head at their other end. By turning the screws, the base plate which is mounted on a support, may be brought into the desired—mostly horizontal—position.

With respect to the use in tape recorders the arrangement has been improved in that elastic means, such as screw-pressure springs, have been arranged between the base plate of the device (head-carrier plate) and the support, with these elastic means pressing the head-carrier plate away from the stationary plate. In this arrangement the adjusting screws are screwed into the stationary plate, and are freely led through the head-carrier plate.

One conventional embodiment uses an L-shaped head-carrier plate which is capable of being adjusted in three planes extending vertically in relation to one another.

This type of embodiment, however, is unsuitable for the use in high-speed tape devices, because for effecting an exact adjustment there is required a backlash or play in relation to the respective direction of movement between the parts which are moved towards each other, so that accordingly, the parts of each bearing point have to be designed differently, and must partly have a very high accuracy.

In order to avoid these disadvantages, in other words, to enable the conventional and simple principle to be used also in order to meet higher requirements, the three-point bearing is improved by a further elastic means. According to the invention the adjustable holding device for magnetic heads, especially for the use in magnetic tape recorders, in which the head-carrier plate is capable of being adjusted with respect to the stationary plate, and with the aid of a three-point bearing, in which elastic means are provided at the individual bearing points, is characterised by the fact that the head-carrier plate is additionally connected to the stationary plate with the aid of an elastic means which is rigidly connected to both parts.

Figure 3:
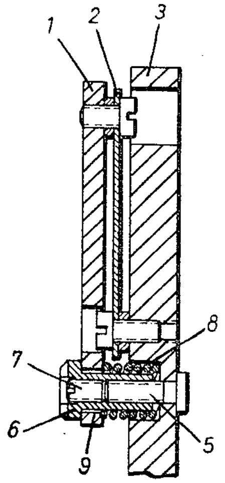
Figure 2:
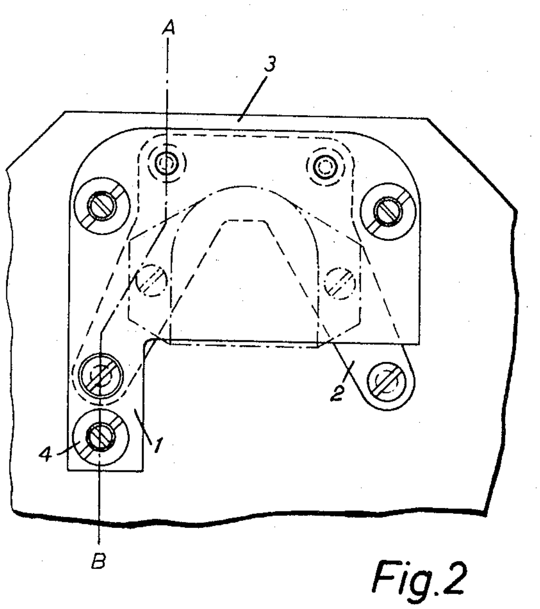

The invention will now be explained in detail with reference to FIGS. 1–3 of the accompanying drawings, in which:

FIG. 1 shows a magnetic head and the three planes in which this head is capable of being adjusted, FIG. 2 shows an adjustable holding device for magnetic heads, according to the invention, and FIG. 3 shows the holding device for magnetic heads in a sectional view taken on line A–B of FIG. 2.

As will be taken from FIG. 1 of the drawings, the magnetic head is provided for a tape device whose front plate is mounted vertically. Of course, it is also possible to make the arrangement in the horizontal way. The three adjusting planes are denoted by arrows. The conventional type of holding device for magnetic heads (see FIG. 3) consists of the base plate 3, of the three screw-pressure springs 8 with the associated screws and nuts, as well as of the head-carrier plate 1.

According to the invention (FIGS. 2 and 3) a V-shaped flat spring is in such a way mounted between the stationary plate 3 and the head-carrier plate 1 that both the head-carrier plate 1 and the flat spring 2 are capable of moving freely. This is accomplished in that at the mounting points between the flat spring and the plate there is inserted a disk adapted to hold the flat spring at a certain spaced relation from the plate. The mounting points are arranged in such a way, and the flat spring is shaped in such a way that the head-carrier plate 1 can be moved within the elastic range of the flat spring 2 in accordance with the adjusting requirements. The flat spring is firmly screwed to both of the plates. The actual adjustment of the head-carrier plate is effected with the aid of three elements 4 of the same type, each consisting of a screw 5, of a nut 6, of a counter screw 7, and of a screw-pressure spring 8. The holes or borings 9 in the head-carrier plate 1 are substantially greater in diameter than the shafts of the nuts 6 because, in contrast to the conventional types of three-point bearings, the three-point bearing in this case only serves the adjusting purpose, but not the purpose of guiding the head-carrier plate. In order to fix the position of the head subsequently to the adjustment, there are provided the counter screws 7.

In conventional types of magnetic head-holding arrangements, after loosening the screws of the three point bearing the head-carrier plate is no longer in connection with the stationary plate, while in the arrangement according to the invention, the addition of the elastic V-shaped flat spring 2 permits during adjustment and assembly a continuous connection between the head-carrier plate and the stationary plate. This facilitates easier assembly and a simpler design of the bearing points, which makes the arrangement according to the invention relatively inexpensive as compared with prior arrangements.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. An adjustable holding device for magnetic heads comprising:

a stationary plate;

a head-carrier plate which is adjustable with respect to said stationary plate by means of a three point bearing arrangement; and elastic means comprising a flat spring rigidly mounted to both said stationary and head-carrier plate, whereby the head-carrier plate is moved within the elastic range of said elastic means in accordance with the adjusting requirements.

2. A device according to claim 1 wherein said elastic means is a V-shaped flat spring.

References Cited by the Examiner

UNITED STATES PATENTS

| | | | |
|---|---|---|---|
| 2,897,288 | 7/1959 | Wijchman -------- | 179—100.2 |
| 3,172,962 | 3/1965 | Van Lammeren et al. | 197—100.2 |

BERNARD KONICK, *Primary Examiner.*

TERRELL W. FEARS, *Examiner.*

A. I. NEUSTADT, *Assistant Examiner.*